US008185503B2

(12) United States Patent  
McElroy et al.

(10) Patent No.: US 8,185,503 B2  
(45) Date of Patent: May 22, 2012

(54) DOCUMENT ARCHIVAL SYSTEM

(75) Inventors: Sean A. McElroy, Moore, OK (US); Martin Milner, Oklahoma City, OK (US); Don L. Stauffer, Oklahoma City, OK (US)

(73) Assignee: Myriad Systems, Inc., Oklahoma City, OK (US)

( * ) Notice: Subject to any disclaimer, the term of this patent is extended or adjusted under 35 U.S.C. 154(b) by 0 days.

(21) Appl. No.: 13/007,748

(22) Filed: Jan. 17, 2011

(65) Prior Publication Data

US 2011/0153572 A1  Jun. 23, 2011

Related U.S. Application Data

(63) Continuation of application No. 11/544,327, filed on Oct. 6, 2006, now Pat. No. 7,873,603.

(60) Provisional application No. 60/725,084, filed on Oct. 7, 2005.

(51) Int. Cl.  
G06F 7/00 (2006.01)

(52) U.S. Cl. ........ 707/661; 707/662; 707/667; 707/668; 707/670; 707/673

(58) Field of Classification Search ............... 707/661  
See application file for complete search history.

(56) References Cited

U.S. PATENT DOCUMENTS

| 2003/0223637 | A1 * | 12/2003 | Simske et al. ............... 382/176 |
| 2005/0172123 | A1 * | 8/2005 | Carpentier et al. .......... 713/165 |
| 2006/0155398 | A1 * | 7/2006 | Hoffberg et al. .............. 700/86 |

* cited by examiner

Primary Examiner — Fazlul Quader  
(74) Attorney, Agent, or Firm — Dunlap Codding, P.C.

(57) ABSTRACT

An archival computer system for receiving digital documents from document source computers, archiving such digital documents, and providing the digital documents to client computer systems. The archival computer system is provided with a document database, a supplemental digital media database, a document input device, an archival computer, and a server. The document input device receives digital documents from the document source computers. The digital documents include non-pixalated, non-rastered digital documents, and supplemental media. The archival computer receives the digital documents, and archives data from the non-pixalated, non-rastered digital documents in the document database, and data from the supplemental media in the supplemental digital media database. The server, upon request, outputs a composite document including data stored in the document database and the supplemental digital media database.

12 Claims, 10 Drawing Sheets

The Portable Document Protocol (PDP) allows for the distillation of the graphical and textual elements of a printed document into a compact textual delimited packet of data for ease of archival and universal reconstruction onto any document rendering device (i.e. video displays; printers; etc). Document pages are made up of a stream of packets.

A PDP packet consists of a header containing the total length of the packet followed by colon (:) delimited data digraphs and associated data. This allows for an efficient compaction of data and ease of reconstruction for rendering.

The header always starts with a tilde (~) character followed by the length the packet (such as ~35 meaning a total of 35 single byte characters make up the packet). Each of the following data elements are made up of a digraph field key and the digraph's corresponding data separated by an equals sign (=) (such as ~35:ob=1:other elements). The digraphs and their meaning are as follows:

ad - Advertisement graphic to embed from the supplemental multimedia database when the page loads.
ck - Sequence number for a check to display when the user clicks the text in the fd field of an op=text line.
       Example ck=20050107001389.
cr - Color triplet representing RGB values (default is 0,0,0 i.e. cr=0.87,0.87,0.87)
fd - Free-form data dependent upon "op" field (always the last item in line)
ff - Font face
fs - Font size. If one number is present, it is height, otherwise it is height,width
fw - Font weight. Can be any combination of n (normal), b (bold), italic (italic)..
p2 - Extent in X and Y of point defined in pt
pt - First locational point x,y
px - Must be in first packet of page. Page extent in X coordinate space units of ux
py - Must be in first packet of page. Page extent in Y coordinate space units of uy
ob - object serialization (i.e. ob=15) always the first item following length
op - Type of data (one of the following: text,rect,ovr,line,bmp)
       fd field will contain type, source, type and name
           fd="tiff;file;c:\somedir\someimage.tif"
           fd="bmp;file;c:\somedir\someimage.bmp"
           fd="png;file;c:\somedir\someimage.png"
           fd="Now is the time for programmers to ..." (text)
           fd="4,4,1000,4,5" (line)
           fd="jpg;file;\\servername\somewhere\someimage.jpg"
ro - orientation 0,90,180,270 (default is 0)
sc - Must be in first packet of page. Source of data (i.e. sc=ps (postscript), sc=pcl)
ux - Must be in first packet of page. Unit of measure in X
uy - Must be in first packet of page. Unit of measure in Y Example:

~44:ob=0:sc=ps:ux=300:uy=300:px=2550:py=3300
(first packet, 44 characters in length, source of data is postscript in resolution units of 300x300 per inch to a maximum page size of 2550 units of width by 3300 units of height)

~59:ob=1:ff="Lucida Console":fs=10:pt=602,2602:fd="My Name"
(render text "My Name" at location 602,2602 using font Lucida Console, 10 units high)

FROM FIG. 3A

```
         SUBTOTAL OF    91  CHECKS              $  38,920.17
            TOTAL OF   173  CHECKS/OTHER CHARGE $  46,259.39

....BALANCE DATE....    ....BALANCE DATE....    ....BALANCE DATE....
      21,232.79   8/08        8,010.38   8/19       15,592.37   9/01
      18,752.32   8/09        5,993.48   8/22       14,140.55   9/02
      17,684.47   8/10        7,909.80   8/23       13,752.80   9/06
      15,824.18   8/11        8,961.42   8/24       15,541.41   9/07
      16,512.23   8/12        7,987.52   8/25       15,792.15   9/08
       9,249.65   8/15        7,511.00   8/26       15,000.04   9/09
       6,669.86   8/16        7,319.34   8/29       15,007.37   9/11
       6,674.07   8/17       16,857.25   8/30
       5,680.60   8/18       17,589.19   8/31
   YEAR TO DATE INTEREST PAID ISW          $      65.01
   LOW BALANCE FOR THE PERIOD WAS          $   5,680.60
   AVERAGE LEDGER BALANCE WAS              $  12,102.80
```

Transferring data from www.mytriadsystems.com...

⊞ start

```
~123:ob=0:op=ad:sc=ps:ux=300:uy=300:px=2550:py=3300:ov="msi_form":ff="L
ucida Console":fs=41.67:pt=206,2300:fd="68,2208,624"~81:ob=1:ff="Lucida
Console":fs=33.33:pt=1653,3161:fd="WITH FREE CHECKING,
GREAT"~50:ob=2:pt=1673,3128:fd="LOANS, ONLINE
SERVICES, "~54:ob=3:pt=1633,3095:fd="AND 19 CONVENIENT
LOCATIONS"~52:ob=4:pt=1653,3062:fd="MSI'S QUICK ACCOUNTS
MAKE"~54:ob=5:pt=1633,3029:fd="MANAGING YOUR MONEY A
SNAP."~66:ob=6:ff="Lucida
Console":fs=41.67:pt=1881,2779:fd="0052058844"~74:ob=7:ff="Lucida
Console":fs=33.33:pt=1826,2486:fd="07/01/04
07/31/04"~58:ob=8:ff="Lucida
Console":fs=41.67:pt=775,304:fd="0.07"~30:ob=9:pt=2219,304:fd="0.00"~35
:ob=10:pt=300,2643:fd="JOHN DOE"~40:ob=11:pt=300,2601:fd="1414
PRIMROSE"~50:ob=12:pt=300,2559:fd="OKLAHOMA CITY OK
73111"~59:ob=13:ff="Lucida
Console":fs=33.33:pt=185,974:fd="0701"~65:ob=14:pt=285,974:fd="
PREVIOUS BALANCE PRIMARY SHARE
S1"~31:ob=15:pt=2347,974:fd="5.20"~30:ob=16:pt=185,941:fd="0731"~40:ob=
17:pt=285,941:fd="
DIVIDEND"~30:ob=18:pt=1844,941:fd=".01"~31:ob=19:pt=2347,941:fd="5.21"~
127:ob=20:pt=285,908:fd=" BASED ON THE AVERAGE BALANCE OF $5.20, YOUR
ACCOUNT HAD AN ANNUAL PERCENTAGE YIELD EARNED OF
2.29%"~79:ob=21:pt=285,875:fd=" FOR THE DIVIDEND PERIOD FROM 070104
THROUGH 073104."~30:ob=22:pt=185,842:fd="0731"~95:ob=23:pt=285,842:fd="
NEW BALANCE DIVIDEND RATE 1.15 DVD CALCULATED ON AVG BAL
METHOD"~31:ob=24:pt=2347,842:fd="5.21"~134:ob=25:pt=285,809:fd="-------
--------------------------------
"~30:ob=26:pt=185,776:fd="0701"~65:ob=27:pt=285,776:fd="        PREVIOUS
BALANCE STUDENT/ORG
CKNG"~32:ob=28:pt=2327,776:fd="13.37"~30:ob=29:pt=185,743:fd="0708"~51:
ob=30:pt=285,743:fd="        SHARE DRAFT
CLEARED"~45:ob=31:ck=99991001:pt=1277,743:fd="005000"~32:ob=32:pt=1760,
743:fd="-
144.00"~31:ob=33:pt=2300,743:fd="144.00"~30:ob=34:pt=185,708:fd="0731"~
57:ob=35:pt=285,708:fd="        MONTHLY DRAFT
MAINTENANCE"~32:ob=36:pt=1804,708:fd="-
3.00"~31:ob=37:pt=2347,708:fd="4.32"~30:ob=38:pt=185,675:fd="0731"~43:o
b=39:pt=285,675:fd="        NEW
BALANCE"~31:ob=40:pt=2347,675:fd="4.32"~134:ob=41:pt=285,642:fd="------
-------------------------------------"~95:ob=42:pt=606,562:fd="-------
------DRAFTS CLEARED IN NBR ORDER--------------------
"~30:ob=43:pt=612,529:fd="0993"~95:ob=44:pt=606,496:fd="--------------
----------------------------------
"~63:ob=172:op=ovr:pt=0,0:p2=2550,3300:fd="jpg;blob;s.imageid=2"
```

*Fig. 5*

DOCUMENT ARCHIVAL SYSTEM

CROSS-REFERENCE TO RELATED APPLICATION

The present patent application is a continuation of U.S. Ser. No. 11/544,327 filed Oct. 6, 2006, now U.S. Pat. No. 7,873, 603 issued on Jan. 18, 2011, which claims priority to the provisional patent application identified by U.S. Ser. No. 60/725,084, filed on Oct. 7, 2005. The entire content of the provisional patent application identified by U.S. Ser. No. 60/725,084, filed on Oct. 7, 2005 and U.S. Pat. No. 7,873,603 are hereby incorporated herein by reference.

STATEMENT REGARDING FEDERALLY SPONSORED RESEARCH AND DEVELOPMENT

Not applicable.

BRIEF DESCRIPTION OF THE SEVERAL VIEWS OF THE DRAWINGS

FIG. 1a is a description of a portable document protocol (PDP) allowing for the distillation of graphical and textual elements of a printed document into a textual delimited packet of data for ease of archival and reconstruction onto a document output device.

FIG. 3A and FIG. 3B illustrates a document output device displaying a document having contextually linked supplemental media that is archived in a document database.

FIG. 5 illustrates a PDP file of a composite document prior to such file being rendered onto the document output device.

DETAILED DESCRIPTION OF THE INVENTION

Figure 1:
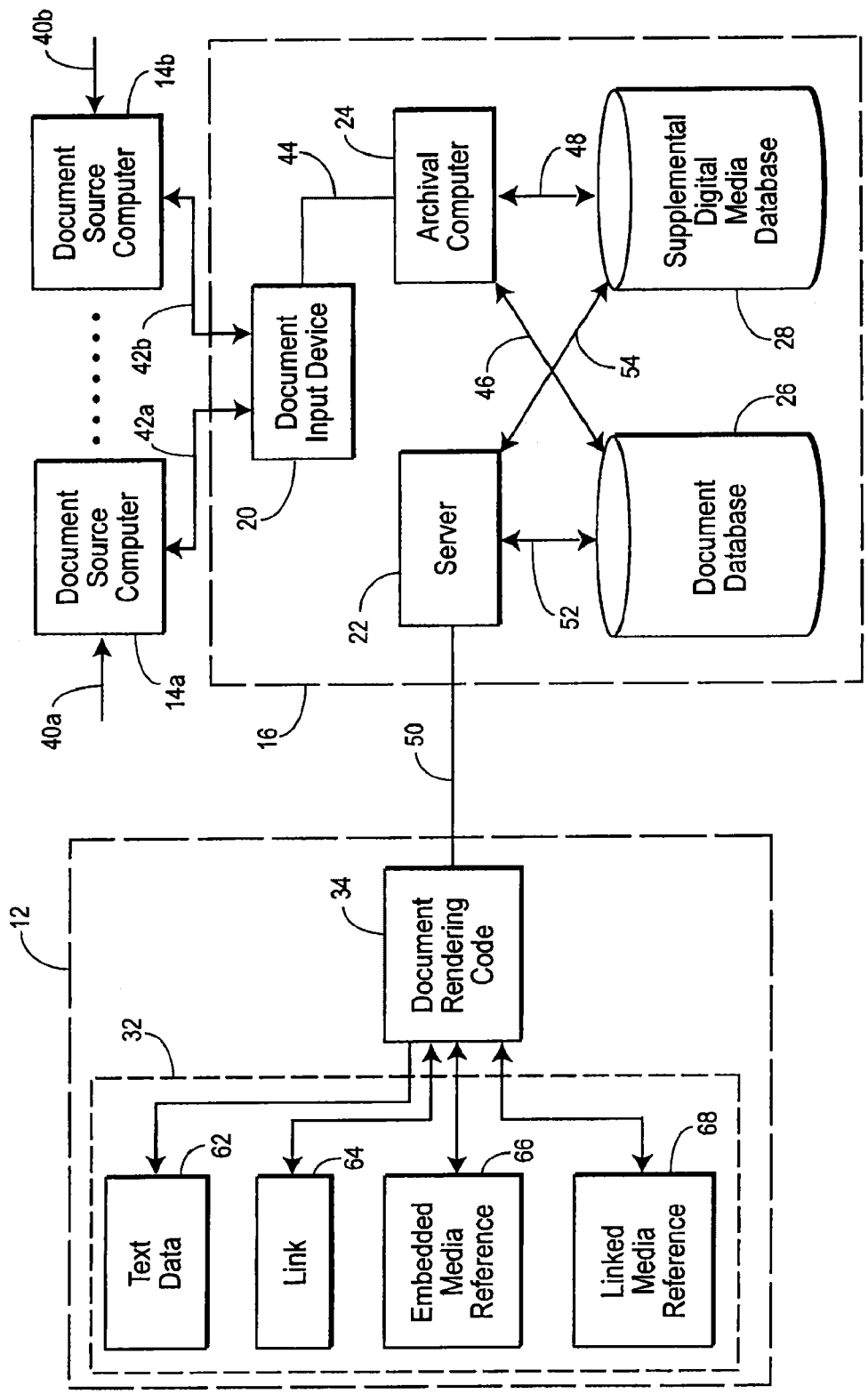
FIG. 1 is a schematic diagram of a document archival system constructed in accordance with the present invention.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

DEFINITIONS

Certain terms are defined throughout this description as they are used, while certain other terms used in this description are defined below.

The term "computer system" and/or "computer" and/or "program logic systems" as used herein means a system(s) that is able to embody and/or execute the logic of the processes described herein. The logic embodied in the form of software instructions or firmware may be executed on any appropriate hardware which may be a dedicated system or systems, or a general-purpose computer system, a personal computer system, a distributed processing system, all of which are well understood in the art and a detailed description of how to make or use such computers is not deemed necessary herein.

The term "communication link" refers to any suitable device or communication system permitting electronic communications and/or optical communications. Examples of such communication systems include internal buses, local area networks, wide area networks, point-to-point shared and dedicated communications, infrared links, microwave links, telephone links, cable TV links, satellite links, radio links, and fiber-optic links. Further, other examples of communication systems include the Internet. The term "communication link" can also refer to any suitable communication system for sending data and/or messages between remote locations, directly or via a third-party communication provider such as AT&T. It should be understood that each of the communication links are shown and described separately herein for the sole purpose of clearly illustrating the information being communicated. In an actual implementation, the communication links may not be separate communication links but maybe a single communication link.

The term "archive" refers to placing or storing data in a long-term storage device or memory so that the data is generally static and not changed or edited after it is stored.

DETAILED DESCRIPTION

Referring now to the drawings, and in particular to FIG. 1, shown therein and designated by a general reference numeral 10 is a document archival system constructed in accordance with the present invention. In general, the document archival system 10 functions to archive digital documents into document databases, and to render such digital documents with supplemental multimedia references (hereinafter referred to as "supplemental media" or "objects") in a vectorized format.

In one embodiment, the document archival system 10 is particularly adapted for archiving and rendering online banking statements. The document archival system 10 provides the combined results of allowing financial institutions to upload and specify specific supplemental media (including text, images, animations, video and/or sounds) to be overlaid and/or rendered on online banking statements when viewed and/or perceived by users such as employees, agents and/or customers of the financial institutions.

While the document archival system 10 will be generally discussed herein with reference to its application for online banking statements for purposes of illustration of the present invention, it should be understood that the document archival system 10 can be used for archiving and rendering other types of documents, such as computer-generated text reports, print output files including Printer Control Language and Post Script, and customer notices, product invoices, service invoices, or billing statements, such as those provided by utility companies, cable companies, phone service providers, etc.

As shown in FIG. 1, in one embodiment, the document archival system 10 is provided with one or more client computer systems 12, one or more document source computers 14 (designated in FIG. 1 by the referenced numerals 14a and 14b for purposes of clarity), and one or more archival computer systems 16.

The document source computers 14 can be any type of computer system capable of generating and/or providing digital documents which are desirably separated as non-pixalated, non rastered digital documents (hereinafter referred to as "NPNR document") and supplemental media as referred or described herein. As such, the document source computers 14a and 14b are preferably adapted to receive at least two different types of documents via lines 40a and 40b, respectively. The first type of documents, the NPNR documents, can include for example text, vector graphics, print output files, etc. The second type of documents, referred to as the supplemental media, can include for example text, images, animations, video, and/or sounds.

In the example described above wherein the documents relate to online banking statements, it is envisioned that the document source computers 14 would be associated with or under the control of a financial institution, such as a bank or credit union.

The documents received and/or generated by the document source computers 14a and 14b are transmitted or communicated to the archival computer system 16. In general, the archival computer system 16 archives the digital documents and serves as an administrative interface accessible by users, (such as financial institution employees, agents or customers) via the client computer systems 12 so that the users can view or otherwise utilize the digital documents. In one embodiment, the archival computer system 16 is provided with a document input device 20, a server 22, an archival computer 24, one or more document databases 26, and one or more supplemental digital media databases 28.

The document input device 20 receives the digital documents (i.e., the NPNR documents and the supplemental media) from the document source computers 14a and 14b via communication links 42a and 42b. The document input device 20 can be any device or computer capable of receiving the digital documents, such as an FTP server or scanner. The documents received by the document input device 20 are then transmitted, passed or communicated to the archival computer 24 via a communication link 44, as will be described in more detail with reference to FIG. 2.

The archival computer 24 preferably processes the supplemental media so as to associate the supplemental media with predetermined NPNR documents. Each of the NPNR documents (or a data file associated with one or more NPNR documents) contain information that identify particular supplemental media to be associated with the NPNR document as well as specify when and how the supplemental media are to be used within a composite document including both the data within the NPNR document and the supplemental media.

Figure 2:
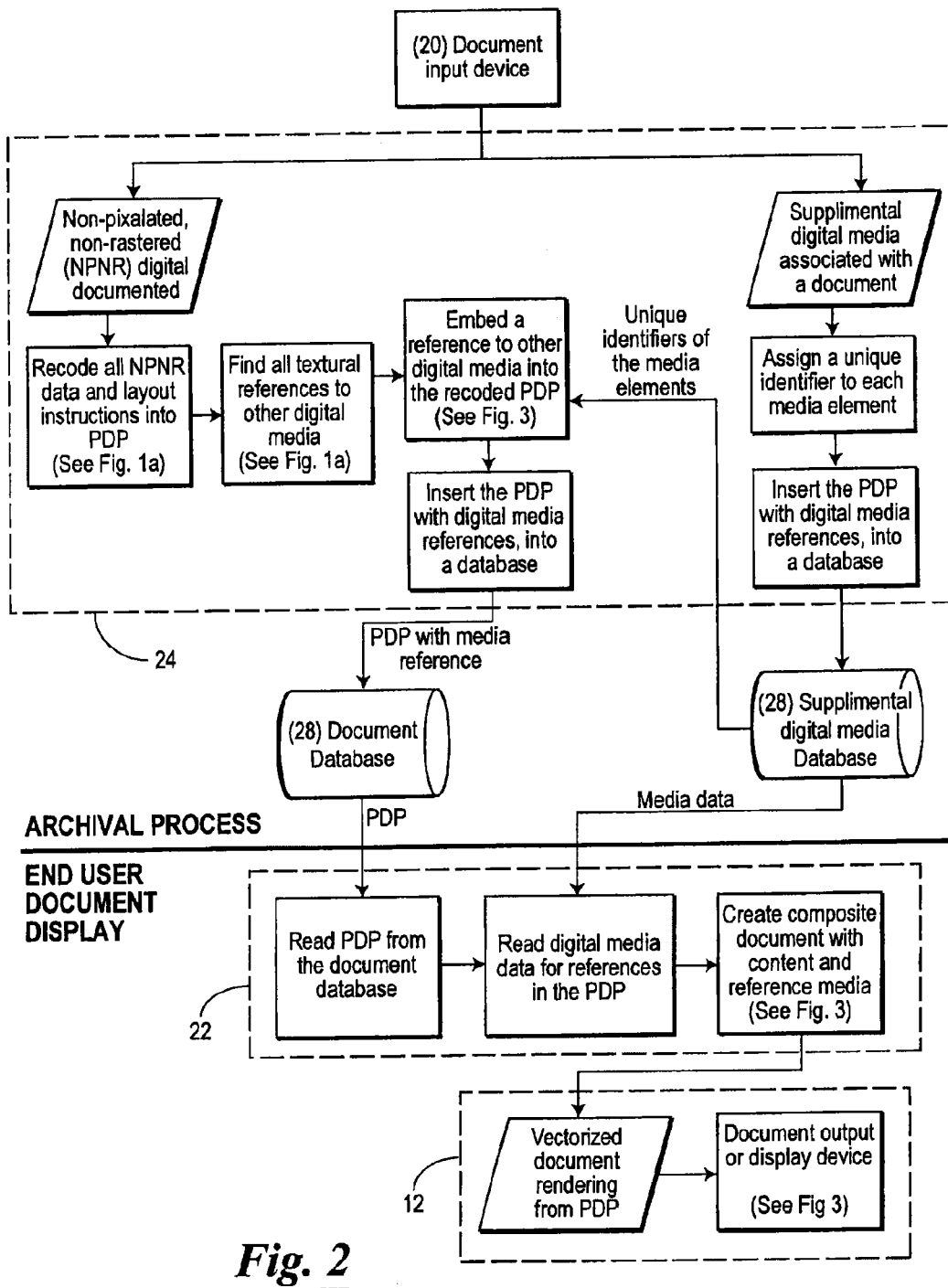
FIG. 2 is a logic flow diagram illustrating a process for archiving and rendering digital documents with supplemental media references in a vectorized format, in accordance with the present invention.
Figure 3A:
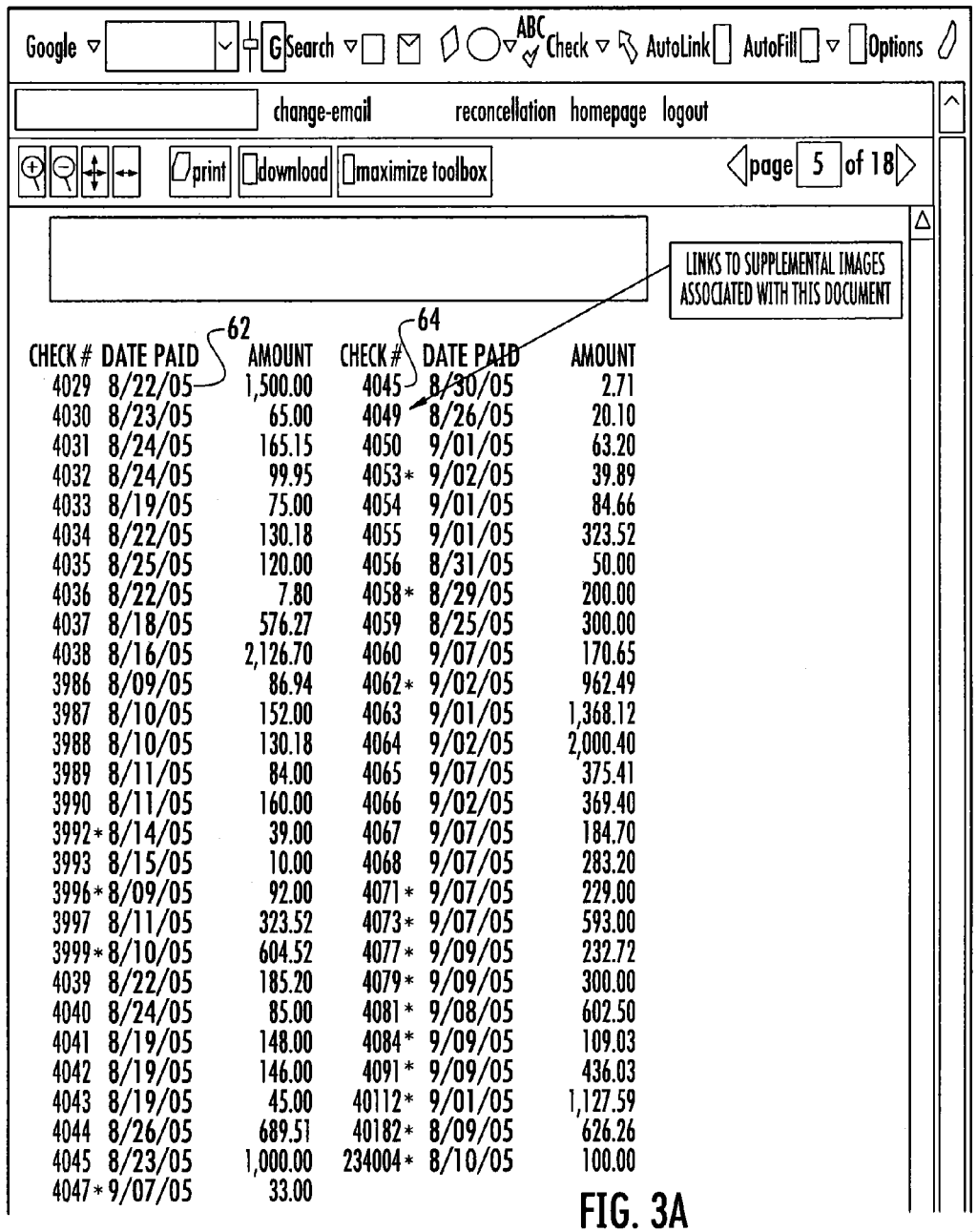

In one embodiment, the association is made by including unique identification codes with the supplemental media. As shown in FIG. 2, in response to receiving the supplemental media, the archival computer 24 assigns a unique identifier to each supplemental media and then inserts each supplemental media into the supplemental digital media database 28. The supplemental media is stored within the supplemental digital media database 28 via the communication link 48. In one embodiment, the supplemental digital media database 28 is a SQL database, and each supplemental media is stored within the SQL database in a Binary Large Objects field. However, it should be understood that any type of database and/or storage technique can be utilized.

Once the supplemental media are uniquely identified and stored in the supplemental digital media database 28, the archival computer 24 processes the NPNR documents to embed references to the supplemental media and store the embedded document in the document database 26. That is, upon receipt of one or more of the NPNR documents, the archival computer 24 desirably recodes the NPNR documents in a PDP format (described in more detail in FIG. 1a) to produce a PDP document, scans the PDP document to locate all references within the PDP document to supplemental media, and embeds the unique identifier assigned to each supplemental media referenced within the recoded document to refer to the supplemental media discussed above. The recoded documents having embedded references are then outputted and/or stored by the archival computer 24 into the document database 26 via a communication link 46 The document database 26 can be any relational database, such as for example a SQL database or other suitable type of database. The embedded document can be stored for example in a text type of field in the document database 26.

When it is desired for a user, (e.g., a financial institution employee, agent, or customer) to review and/or to perceive the composite document including the embedded document (or PDP document) having the supplemental media included or referenced therein, the user makes a request to the archival computer system 16 via one of the client computer systems 12. The client computer system 12 is provided with a document output device 32, and a document rendering code 34. The document output device 32 can be any device that can output or render the document, such as a computer monitor or a printer. The document rendering code 34 receives a composite document in a vectorized format, as will be discussed below, and renders the composite document to the document output device 32.

Preferably, the users of the client computer system 12 must first authenticate their identity (via a username/password, biometric, or other authentication schemes), and then such users can request to see or perceive one or more of the composite documents. To request one or more composite documents, the client computer system 12 outputs a request to the server 22 via a communication link 50, which is commonly the "Internet." The server 22, which is typically a web server, receives the request from the client computer system 12 and then retrieves the PDP document having the embedded identifiers of the supplemental media references from the document database 26 via a communication link 52, and also retrieves the supplemental digital media from the supplemental digital media database 28 via a communication link 54, and then creates a composite document having the content and the referenced media included therein.

As such, it can be seen that the document archival system 10 can be adapted to provide three primary processes: uploading NPNR documents and supplemental media, specifying when and how the supplemental media are to be used with respect to the NPNR documents, and inserting the supplemental media into the NPNR documents to render the online statements.

In other words, the method by which the document archival system 10 functions begins by receiving one or more supplemental media and NPNR documents from an employee, customer, or other party authorized by the financial institution operating the document source computers 14. These documents and/or supplemental media may be uploaded to the document input device 20 via an HTTP (Hypertext transfer protocol) upload process, a HTTPS (secure Hypertext transfer protocol) upload process, or an FTP (file transfer protocol) upload process. The users of the document source computers 14 must first authenticate their identity (via a username/password, biometric, or other authentication schemes), and then such users are permitted to upload one or more of the non-pixilated, non-raster digital documents, and or the supplemental media. The administrator of the archival computer system 16 may define certain criteria to limit users from uploading more than a specified number of supplemental digital media objects or the administrator may specify a maximum size allowed for one or a combination of supplemental media. The manager and/or administrator of the archival computer system 16 may also be required to approve uploaded supplemental media prior to their insertion into the NPNR documents, such as online bank statements, to ensure that such supplemental media are complete, functional and appropriate for the context.

Secondly, the users of the document source computer 14 can optionally specify when and how such supplemental media objects are to be used. For example, such users may define the objects name, description, media type (such as text, images, or the like), context (overlay, logo, error message, or the like), and/or limiting criteria such as which period of statements or individual statement cycles should include the object. Additionally, the document archival system 10 allows the users, such as financial institution employees and agents to determine an order of precedence for supplemental media at the same context. The order of precedence allows the document rendering code 34 to specify that in the event a supplemental media cannot be rendered for any reason (for example the supplemental media is incomplete, the supplemental media is not supported for display on the current display medium, or the like), which supplemental media to display in its place. This allows for the appropriate static elements, such as images, to replace dynamic elements, such as animations, across static medians such as printed paper.

Thirdly, the document archival system 10 automatically inserts the supplemental media into the composite document, such as online statements. The document rendering code 34 upon rendering a statement page for example, checks the uploaded supplemental media and determines which to insert. The document rendering code 34 will include supplemental media that belong to the same financial institution, for example, as the banking customer for which the document rendering code 34 is rendering the statement page and that meet any limiting criteria specified regarding the supplemental media. Additionally, the document rendering code 34 will use the supplemental media's user-defined media type and context to determine how, where and when the selected objects are rendered across their display medium, whether via World Wide Web, direct down load, screen display, printing or other media. If the current display medium does not support the selected supplemental media, the next supplemental media that matches the same context and has a lower order of precedence is selected for rendering instead.

Figure 4A:
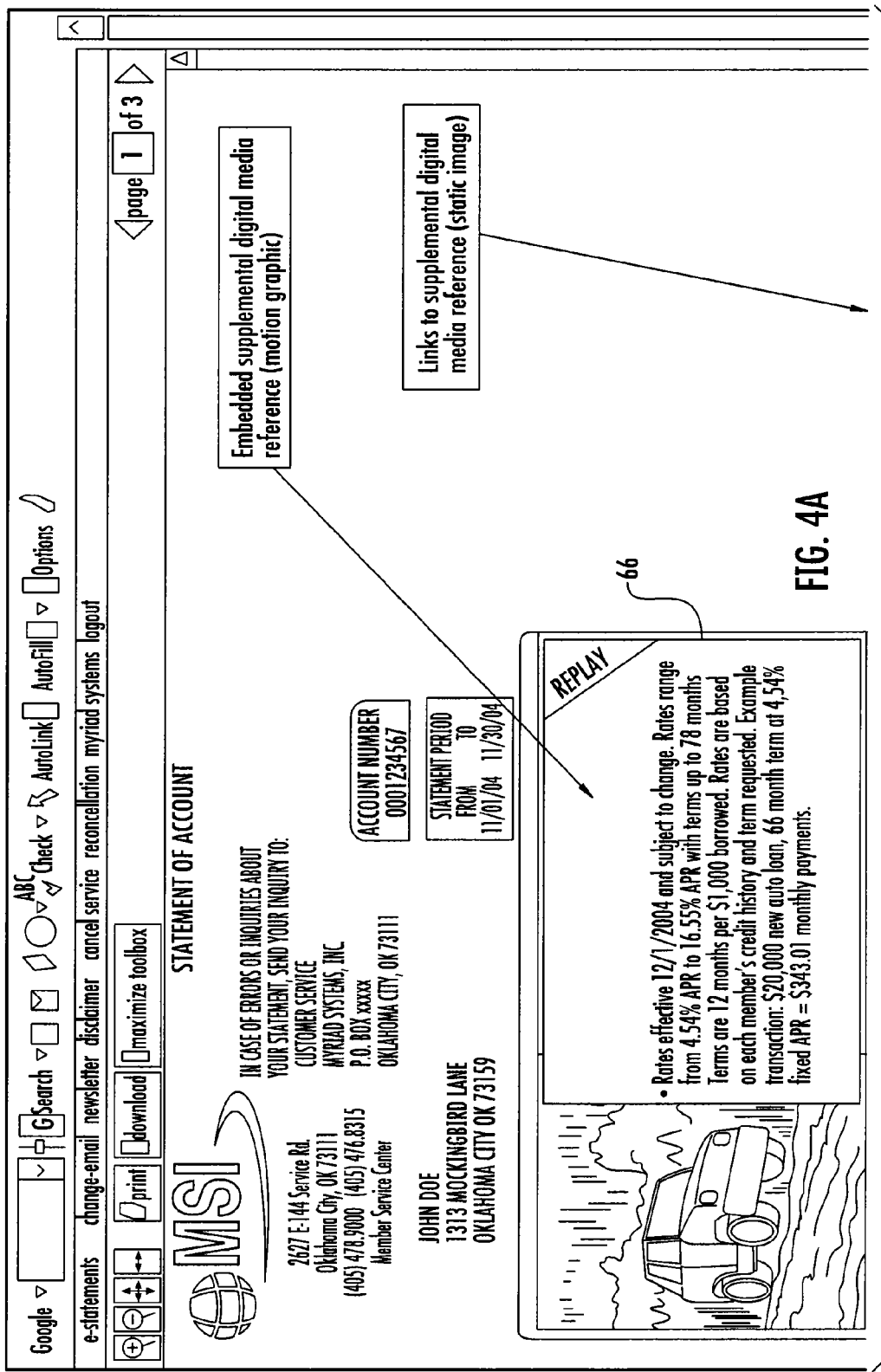
FIG. 4A and FIG. 4B illustrates a display of the document output device showing a composite document having embedded and linked supplemental media.
Figure 4B:
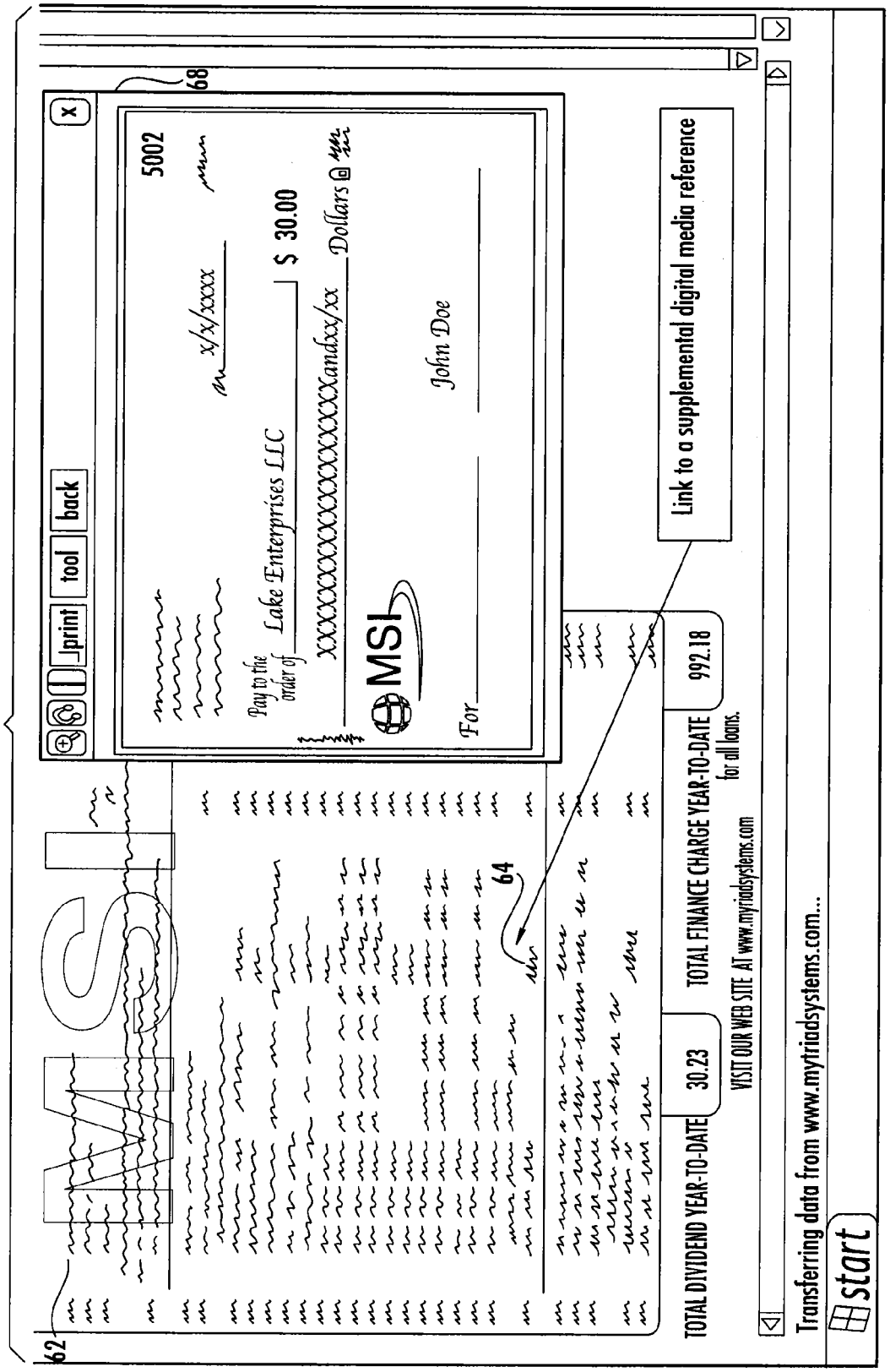

The composite document rendered onto the document output device 32 can have a variety of different types of components 60. The components 60 can be generally classified as text data 62, one or more links 64, one or more embedded media reference 66, and one or more linked media reference 68. Examples of the text data 62, links 64, embedded media reference 66 and linked media reference 68 are shown in Figures and/or FIGS. 4A and 4B. In these examples, the text data 62 includes information regarding a banking statement, such as a customer name, address and account number, a statement period, transaction numbers, transaction descriptions, transaction amounts, and the like. The links 64 are in the form of check numbers and are linked with the unique identifiers identifying the supplemental media in the supplemental media database 28. When one of the links 64 are selected, a request is transmitted to the server 22 including the unique identifier identifying the supplemental media. The server 22 retrieves the supplemental media identified by the unique identifier from the supplemental media database 28 and then downloads the supplemental media to the document rendering code 34 of the client computer system 12 for rendering to the document output device 32. In these examples, the linked media reference 68 is a check image. The embedded media reference 66 in this example includes a dynamic advertisement banner.

Figure 6:
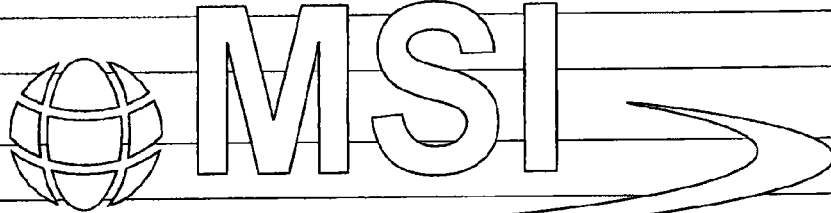
FIG. 6 illustrates the composite document of FIG. 5 after the composite document has been rendered onto the document output device in accordance with the present invention.
Figure 7:
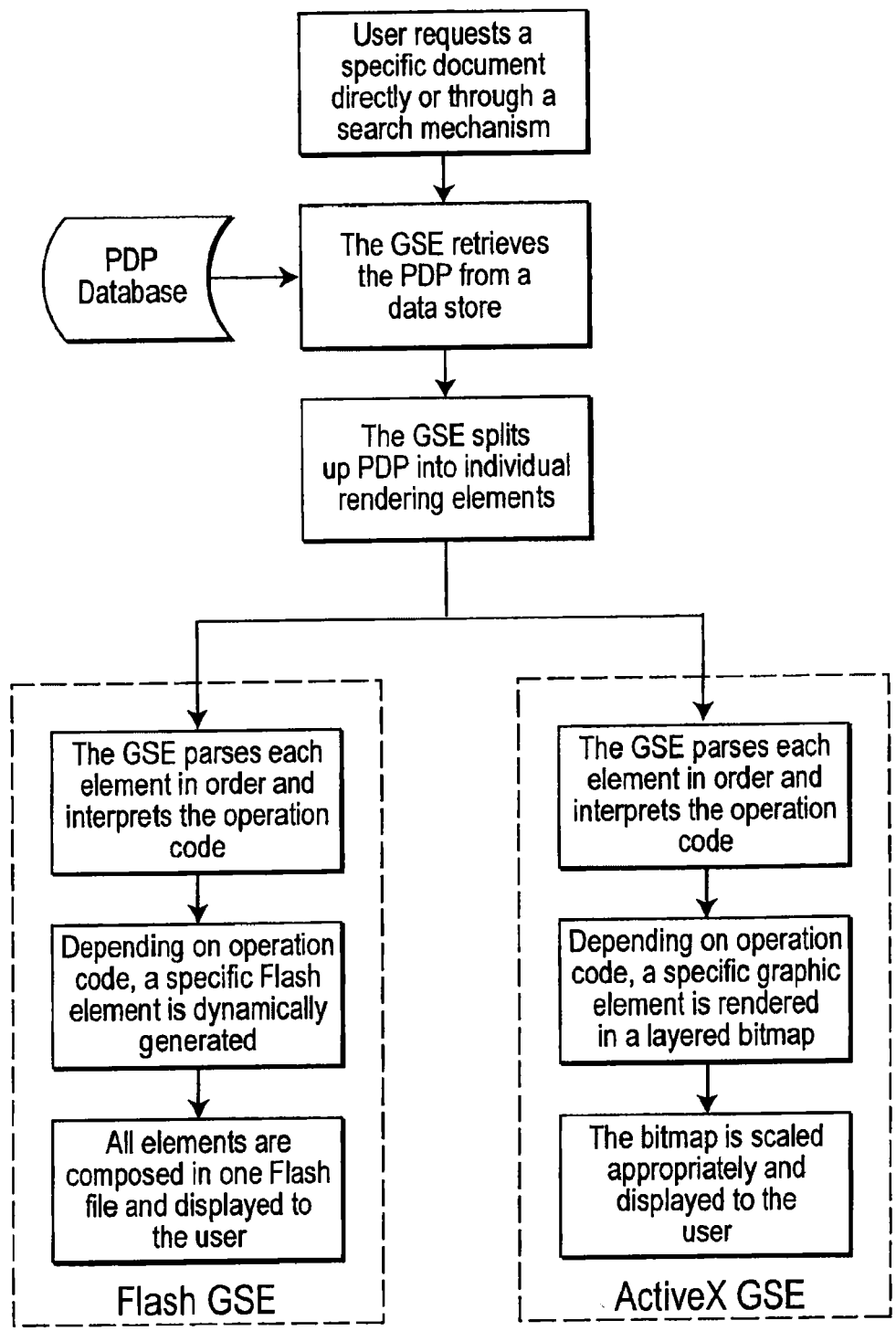
FIG. 7 is a process flow diagram for one version of a document rendering code utilized in accordance with the present invention.

An example of the composite document is shown in FIG. 5. The composite document is transmitted from the server 22 to the document rendering code 34 of the client computer system 12 via the communication link 50 where the document rendering code 34 renders the document to the document output device 32 as will be described in more detail below. FIG. 6 shows an example of the rendered document formed by the composite document depicted in FIG. 5. In the example of FIG. 6, the text data 62 includes information regarding a customer name, address and account number, a statement period, transaction numbers, transaction descriptions, transaction amounts, and the like. The links 64 are in the form of check numbers and are linked with the unique identifiers identifying the supplemental media in the supplemental media database 28. The MSI form background is the embedded media reference.

The document rendering code 34 can be implemented as a flash viewer, for example, or as an installed application designed to receive the composite document and render such composite document to the document output device 32. The document rendering code 34 is preferably compatible with a Web browser so that the rendered document appears within the Web browser.

It should be understood that when the linked media reference 68 are uploaded and rendered on the document output device 32, this is desirably accomplished by overlaying the linked media reference 68. This greatly increases the speed in which the linked media reference 68 can be rendered because it eliminates the need of opening a separate "pop-up" window, or refreshing or redrawing the existing display.

The document archival system 10 also includes security features for preventing users from viewing other user's supplemental media. When supplemental media is stored in the digital media database 28, some other contextual information may be interpreted from the media as to how it is associated or related to other documents or media elements. For instance, a check image may have an account number assigned to it, which would match an account number on a statement document. When such contextual metadata is stored with supplemental media, the document retrieval system can verify that this information matches to add a layer of security to the supplemental media retrieval process. In this example, if a statement document was encoded into PDP with a link to a check that did not have an account number that matched the account number of the statement, then the system would prevent the check from being rendered to the receiver.

The document rendering code 34 also has the ability to conduct a text search through all of the text data 62, one or more links 64, one or more embedded media reference 66, and one or more linked media reference 68. The search function is accomplished by reading through the PDP encoding for a given page, entire document, or set of documents and executing a pattern matching algorithm on the content data stored within the freeform data portion of text lines. The freeform data, that is, the actual data that is rendered on the page in a particular format, is then shown to a user either by highlighting the text on a page and/or producing a list of search results to the user.

It will be understood from the foregoing description that various modifications and changes may be made in the preferred and alternative embodiments of the present invention without departing from its true spirit. This description is intended for purposes of illustration only and should not be construed in a limiting sense. "A," "an" and other singular terms are intended to include the plural forms thereof unless specifically excluded.

What is claimed is:

1. An archival computer system for receiving digital documents from document source computers, archiving such digital documents, and providing the digital documents to client computer systems, the archival computer system comprising:
   a document database including a text field;
   a supplemental digital media database;
   a document input device receiving at least two types of digital documents from the document source computers, the at least two types of digital documents including non-pixalated, non-rastered digital documents, and supplemental media;
   an archival computer receiving the at least two types of digital documents, and archiving data from the non-pixalated, non-rastered digital documents in the document database, and data from the supplemental media in the supplemental digital media database, the non-pixalated, non-rastered digital documents containing information identifying particular supplemental media as well as specifying how the supplemental media are to be used within a composite document including both the data within the non-pixalated, non-rastered digital document and the supplemental media, the archival computer processing the non-pixalated, non-rastered digital documents to embed unique references to the supplemental media and storing the embedded references to the supplemental media in the text field of the document database; and
   a server, upon request, outputting the composite document including data stored in the document database and the supplemental digital media database.

2. The archival computer system of claim 1, wherein the document input device receives a data file associated with one or more non-pixalated, non-rastered digital documents, the data file including information that identify particular supplemental media to be associated with the non-pixalated, non-rastered digital documents.

3. The archival computer system of claim 1, wherein the supplemental digital media database includes a binary large objects field, and wherein the supplemental media are stored in the binary large objects field.

4. The archival computer system of claim 3, wherein the supplemental digital media database is a relational database.

5. The archival computer system of claim 1, wherein the composite document includes instructions for rendering at least one of the supplemental media by overlaying the supplemental media.

6. The archival computer system of claim 1, wherein the composite document is in a vectorized format.

7. A method, comprising the steps of:
   receiving a request for a composite document formed by a first type of document having embedded identifiers stored in a text field within a document database, the embedded identifiers identifying a second type of document comprising supplemental media stored in a supplemental digital media database;
   retrieving the first type of document;
   retrieving the second type of document comprising supplemental media identified by the identifiers embedded in the first type of document; and
   outputting the first type of document and the second type of document comprising supplemental media in a format to be rendered into a composite document by a document rendering code of a client computer system.

8. The method of claim 7, wherein the first type of document includes information setting an order of precedence for supplemental media at the same context.

9. The method of claim 7, further comprising the step of automatically inserting supplemental media into the composite document.

10. The method of claim 7, wherein the composite document is an online financial institution statement.

11. The method of claim 7, wherein in the step of outputting the first type of document and the second type of document comprising supplemental media references, at least one of the supplemental media is output with instructions to overlay the supplemental media.

12. The method of claim 7, wherein the supplemental digital media database includes a binary large objects field, and wherein the second type of documents comprising supplemental media are stored in the binary large objects field.

* * * * *